United States Patent [19]

Sewell

[11] Patent Number: 5,052,238

[45] Date of Patent: Oct. 1, 1991

[54] MANUAL TRANSMISSION SHIFT LINKAGE

[75] Inventor: John S. Sewell, Yorktown, Ind.

[73] Assignee: Borg-Warner Automotive, Inc., Sterling Heights, Mich.

[21] Appl. No.: 510,369

[22] Filed: Apr. 17, 1990

[51] Int. Cl.⁵ ............................................. F16H 61/00
[52] U.S. Cl. ..................................... 74/473 R; 74/477
[58] Field of Search .............. 74/473 R, 339, 477, 74/104, 337.5

[56] References Cited

U.S. PATENT DOCUMENTS

| | | | |
|---|---|---|---|
| 3,929,029 | 12/1975 | Kelbel | 74/473 R |
| 4,193,316 | 3/1980 | Kelbel | 74/477 |
| 4,228,693 | 10/1980 | Kelbel | 74/339 |
| 4,337,675 | 7/1982 | Holdeman | 74/477 |
| 4,986,142 | 1/1991 | Borodin | 74/473 R |

*Primary Examiner*—Richard E. Moore
*Attorney, Agent, or Firm*—James A. Geppert; Greg Dziegielewski

[57] ABSTRACT

A manually-actuated six speed transmission (10) for use in an automotive vehicle wherein a vehicle operator actuates said transmission through a shift lever (82) actuating a primary shift rail (81) in the transmission housing (11), the transmission including an input shaft (12), an output shaft (13) axially aligned with the input shaft, a countershaft (15) having a gear cluster (17) thereon, the input shaft terminating in an input gear (14) which also acts as a fourth gear for direct drive, a plurality of gears (18, 19, 20, 21, 22, 23, 24) on the countershaft providing first through sixth gears and reverse, and a plurality of synchronizers (36, 38, 41, 42) on either the output shaft (13) or the countershaft (15) for actuating said gears. The synchronizers include a 1-2 synchronizer (36), a 3-4 synchronizer (38) and a reverse synchronizer (42) encompassing the output shaft (13), and a 5-6 synchronizer (41) encompassing the countershaft (15). An auxiliary shift rail (98) is provided in the housing positioned generally between the output shaft (13) and countershaft (15) for the 5-6 shift fork (69) and the reverse shift fork (77) without the complicated linkages previously found in five and six speed transmissions.

6 Claims, 8 Drawing Sheets 5,052,238

MANUAL TRANSMISSION SHIFT LINKAGE

TECHNICAL FIELD

The invention disclosed herein relates to a multiple speed sliding gear manual transmission having an improved shift rail arrangement for the shifting of the gears during operation of the vehicle in which the transmission is utilized to transmit torque from an engine acting as a driving force for the vehicle to the differential and driving wheels thereof.

BACKGROUND

Transmissions are utilized in an automotive vehicle for the transmittal of torque from a driving means, such as an internal combustion engine, to the final drive, such as a differential for the driving wheels of the vehicle. A shift control apparatus is used to enable the operator of the vehicle to control a multiple speed, sliding gear manual transmission for a plurality of forward speed ratios and a reverse speed ratio, the shift control apparatus providing appropriate crossover positions for a shift stick actuated by the vehicle operator. Each crossover position selects a shift fork or the like, which may be moved longitudinally in opposite directions to engage either one or two speed ratios.

In a four speed transmission, one crossover position is used to select the first and second speed ratios, another the third and fourth speed ratios, and another the reverse speed ratio. Likewise, in a five speed transmission, one crossover position is used to select the first and second speed ratios, another the third and fourth speed ratios, and yet another the fifth and reverse speed ratios. More recently, it is desirable under certain conditions that vehicle transmissions have six forward speed ratios to provide a sufficient number of gear ratios to enable the operator of a vehicle to provide the torque required for a smooth transition through the gears and arrive at a desired final driving speed. In conventional five and six speed transmissions, a main shift rail and an auxiliary shift rail are provided with a linkage arrangement to couple the main and auxiliary shift rails and the reverse idler gear. The linkage mechanism normally requires two levers arranged in a complicated assembly and two cam devices which must be precisely coordinated, resulting in a linkage mechanism that is complex and expensive. More recent developments have simplified the linkage mechanism but an auxiliary shift rail is still necessary.

DISCLOSURE OF THE INVENTION

The present invention relates to a manual transmission shift linkage modification which allows a single rail type shift linkage having an interlock mechanism located in the main case or housing for the transmission to operate two additional synchronizers located in an extension housing. The sleeves of these additional synchronizers move in the same axial direction as the single shift rail. The transmission gearing for the first through fourth gears of the transmission remains conventional in arrangement and operation, however, two additional gears are provided with a lower or auxiliary shift rail journalled in the main case and a synchronizer located on the cluster gear in the extension housing. Also, the reverse synchronizer is located on the main shaft in the extension housing with the reverse shift fork retained at the rear of the lower shift rail for axial movement therewith, but the fork is free to rotate relative to the rail.

MODE FOR CARRYING OUT THE INVENTION

Figure 1:
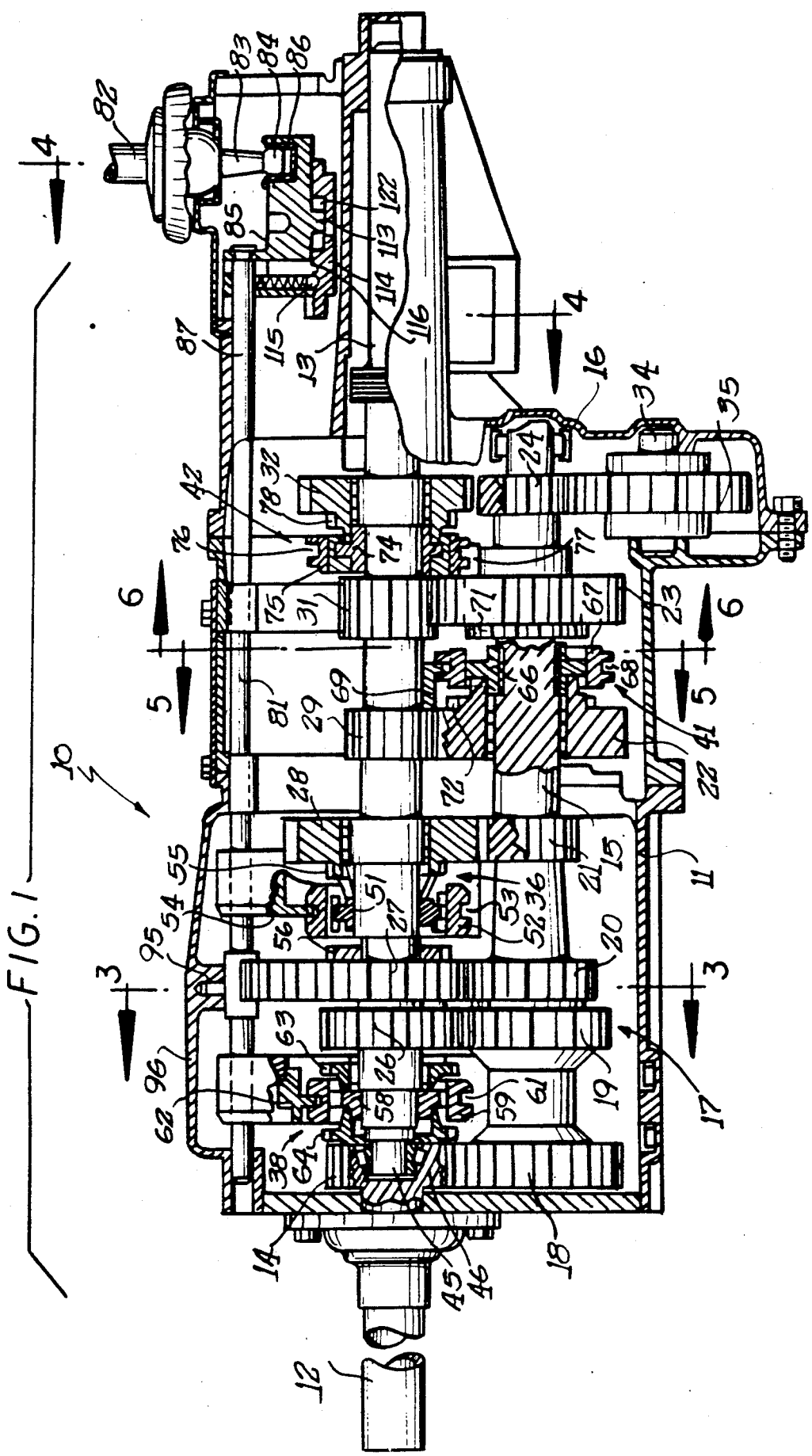
FIG. 1 is a cross sectional view through the housing of a six speed manual transmission, with the auxiliary shift rail omitted and portions of the gears in cross section, showing the overall relationship of the components with the gears revolved into the plane of the paper for clarity.

Referring more particularly to the disclosure in the drawings wherein is shown an illustrative embodiment of the present invention, FIG. 1 discloses a multiple speed, sliding gear manual transmission 10 adapted for use in an automotive vehicle, which transmission includes a housing 11 that may be associated with a suitable clutch housing (not shown) receiving torque from a driving force, such as an internal combustion engine. An input shaft 12 extends from the adjacent clutch and is journalled in the housing 11, and an axially aligned output shaft 13 is journalled in and extends from the opposite end of the housing to be operatively connected to a ring gear of an associated differential (not shown) acting to drive the road engaging wheels of the vehicle.

Input shaft 12 terminates within the housing in an integral input gear 14 meshing with a separate gear 18 of a gear cluster 17 integral with a countershaft 15 journalled at one end in the housing 11 and at the opposite end in an extension housing 16. The gear cluster 17 on the countershaft 15 includes gears 18, 19, 20 and 21 integral with the countershaft, gears 22 and 23 journalled on the countershaft, and a reverse gear 24 also integral with the countershaft. The output shaft 13 carries output gears 26, 27 and 28 journalled on the shaft, gears 29 and 31 mounted to rotate with the shaft 13, and a reverse gear 32 journalled on the shaft. A reverse idler shaft 34 is also journalled in the housing 11 and extension 16 for an idler gear 35 mounted thereon in meshing engagement with the reverse gears 24 and 32. As clearly seen in FIG. 1, the gears 19 and 26 mesh together, as do gears 20 and 27, gears 21 and 28, gears 22 and 29, and gears 23 and 31.

A slidable 1-2 synchronizing clutch 36 is supported on the output shaft 13 between gears 27 and 28, a slidable 3-4 synchronizing clutch 38 is supported on the shaft 13 between the gears 14 and 26, a third slidable 5-6 synchronizing clutch 41 is supported on the countershaft 15 between the gears 22 and 23, and a fourth slidable reverse gear synchronizing clutch 42 is supported on the output shaft 13 adjacent the reverse gear 32. Also, as clearly seen in FIG. 1, the inner end 45 of the output shaft 13 is journalled within an enlarged end 46 of the input shaft 12 defining the gear 14.

More specifically, the 1-2 synchronizer 36 includes a hub 51 splined or otherwise suitably connected to the shaft 13 having a clutch sleeve 52 slidably mounted on the hub so as to move in one direction into engagement with a blocking ring and teeth 55 on the first gear 28 and in the opposite direction into engagement with a similar blocking ring and teeth 56 on the second gear 27; the sleeve 52 having an external annular groove 53 to receive a 1-2 shift fork 54 therein. Likewise, the 3-4 synchronizer 38 includes a hub 58 splined onto the shaft 13 and having a slidable clutch sleeve 59 operatively mounted thereon to move in one direction to engage a blocking ring and teeth 63 on the third gear 26 and in the opposite direction to engage a blocking ring and teeth 64 on the input gear 14, which provides a direct drive for the fourth gear. The sleeve also has an external annular groove 61 therein to receive a 3-4 shift fork 62.

The 5-6 synchronizer 41 is provided with a hub 66 splined to the countershaft 15 and having a slidable clutch sleeve 67 thereon provided with an annular groove 68 for the 5-6 shift fork 69. The sleeve moves in one direction to engage a blocking ring and teeth 71 on the fifth gear 23 and in the opposite direction to engage a blocking ring and teeth 72 on the sixth gear 22. Finally, the reverse synchronizer 42 includes a hub 74 splined onto the shaft 13 and carrying a slidable clutch sleeve 75 having a annular groove 76 for the reverse fork 77; the sleeve being capable of moving in only one direction to engage a blocking ring and teeth 78 on the reverse gear 32 journalled on the shaft 13.

An axially movable and rotatable shift rail 81 is located in and journalled in the upper portion of the housing 11 and extension 16 for operation by a shift stick or lever 82 in the operator's compartment of the vehicle. The lever includes a depending arm 83 having its end 84 received in a socket 86 of an offset lever 85, which lever is secured onto the inner end 87 of the shift rail 81, and the shift forks 54 and 62 are secured to and axially spaced along the shift rail. Generally laterally aligned with gears 26 and 27 is a teardrop plate or selector body 88 (FIG. 3) attached to the shift rail 81 and a selector finger 89 is secured to the selector body 88. The selector finger 89 engages a notch in either one of the shift plates 91 or 92 so that, as the shift rail is moved axially, the selected shift plate moves with the rail. The shift plate 91 is operatively connected to the 1-2 fork 54 and the plate 92 is likewise connected to the shift fork 62. A generally C-shaped interlock plate 94 (FIG. 3) is located via a slot 95 in the top cover 96 of the housing 11 and also extends out into the notches in the shift plates 91 and 92 so that the shift plate which is not engaged by the selector finger 89 is prevented from moving axially as the shift rail is moved axially.

Figure 2:
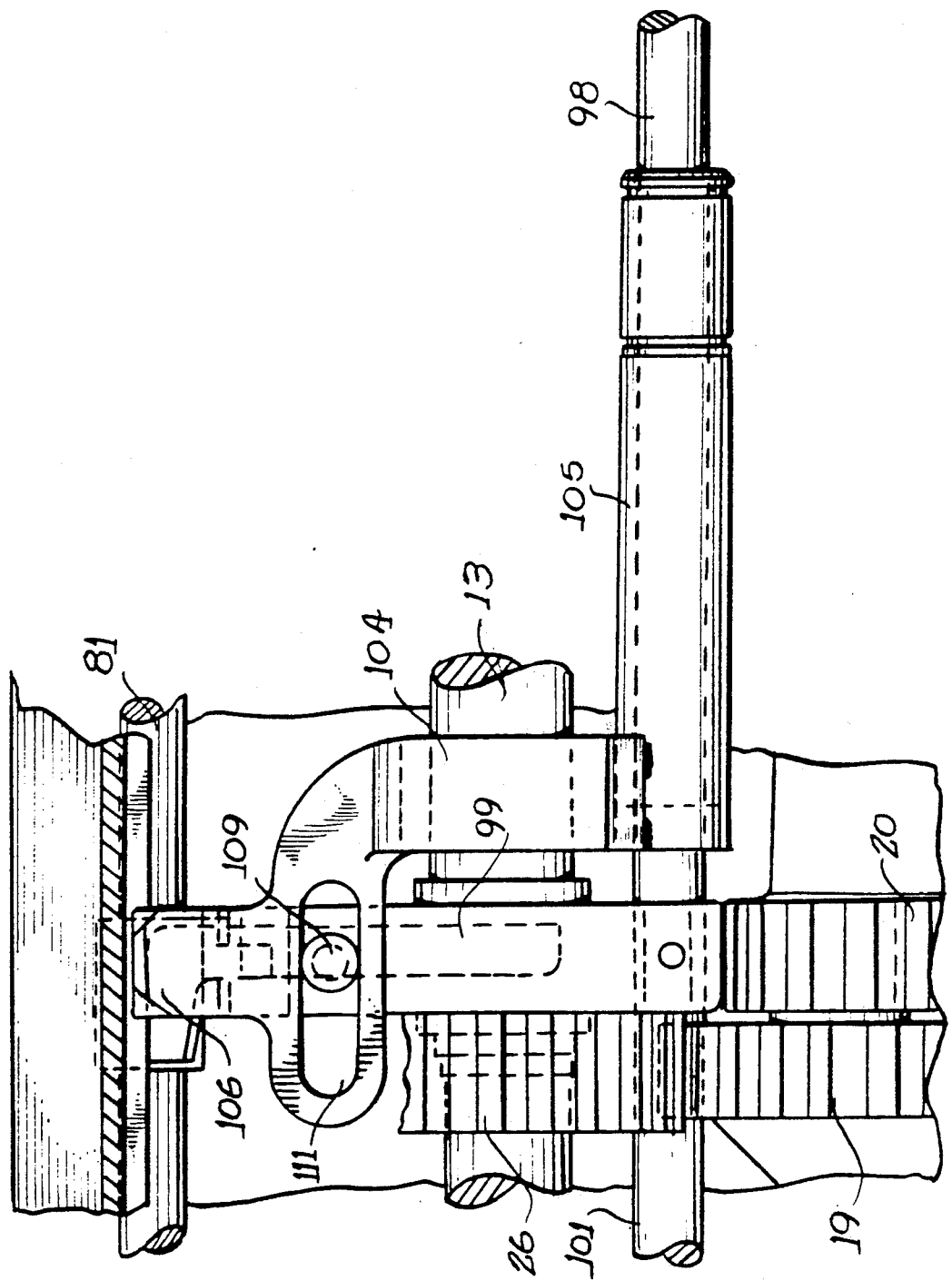
FIG. 2 is a cross sectional view taken on the line 2—2 of FIG. 3 showing the details of the auxiliary shift rail with the gearing behind it omitted.
Figure 3:
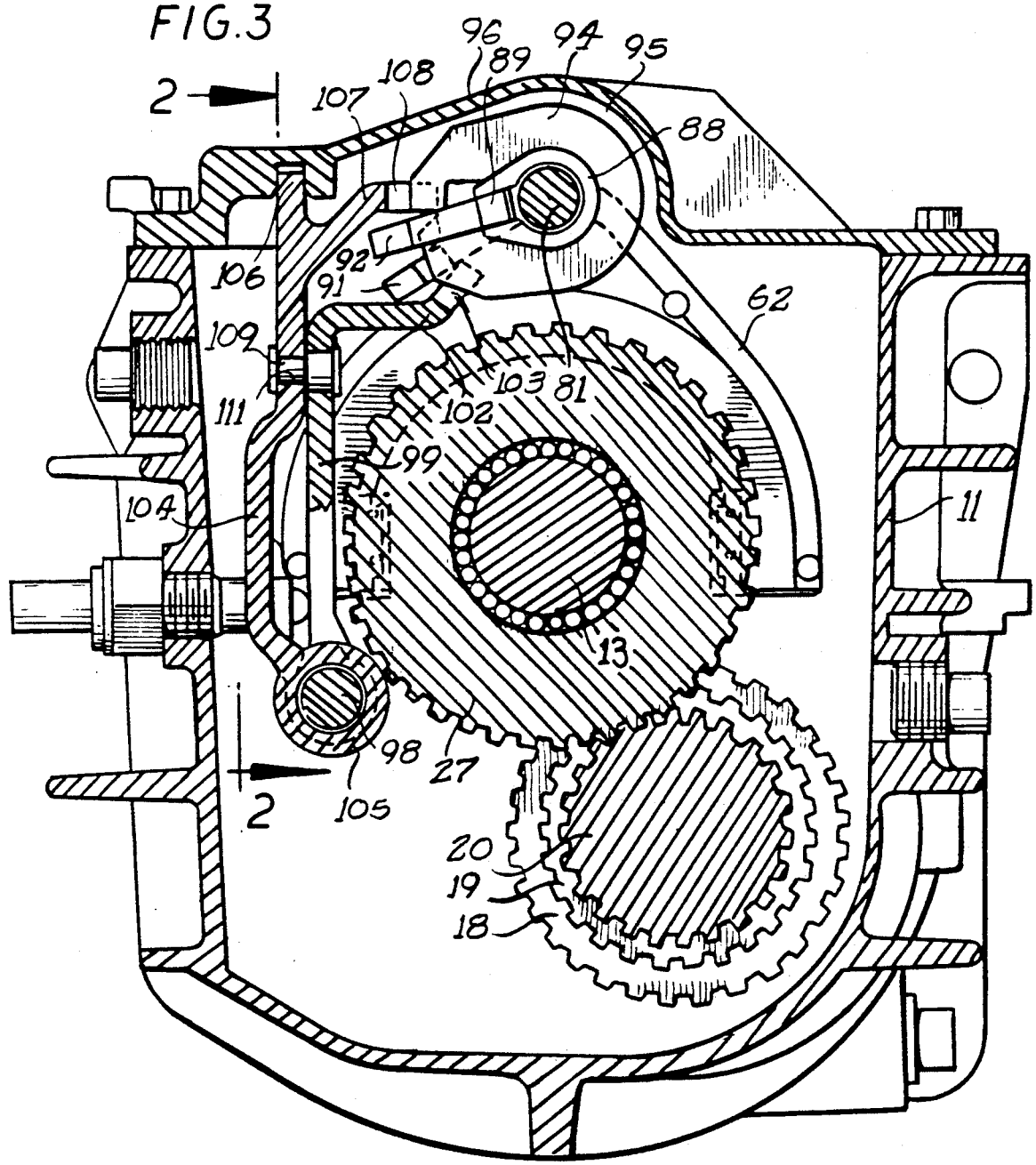
FIG. 3 is a cross sectional view taken on the line 3—3 of FIG. 1 showing details of the auxiliary shift rail.
Figure 9:
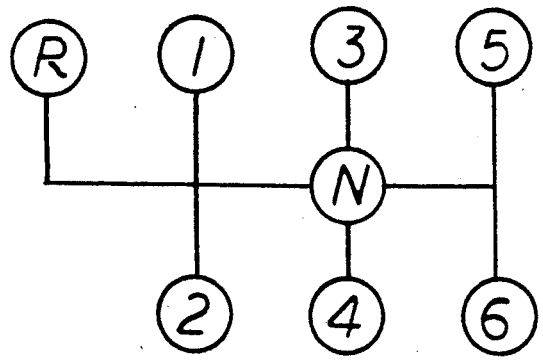
FIG. 9 is a diagrammatic view illustrating the six speed shift pattern as seen by an operator of the vehicle.

The transmission 10 is a six speed manual transmission with a shift pattern as shown in FIG. 9. The 5-6 synchronizer 41 is located on the cluster gear 17 in the extension housing 16, although this synchronizer could be located on the main shaft 13 also. A lower or auxiliary shift rail 98 (FIG. 2) is journalled in the main housing 11 and the forward extension housing 16. The reverse shift fork 77 is retained at the rear end of the lower shift rail 98 to move axially therewith, but is free to rotate on this rail. A reverse shift arm 99 is secured to the forward part 101 of the lower rail 98 and extends upward from the lower rail and over toward the main shift rail 81 as seen in FIG. 3. The end 102 of this arm is located below the 1-2 shift plate 91 and has a notch 103, similar to the notch in the shift plates 91 and 92, to accept either the selector finger 89 or interlock plate 94.

A 5-6 shift arm 104 is mounted on a tube 105 which is journalled on the lower shift rail 98. This shift arm 104 extends upward from the lower rail and has an upper end 106 suitably received in the top cover 96 to prevent the arm from rotating about the axis of rail 98. The upper end 106 includes a branch 107 extending over toward the main rail 81, the end of this branch being located above the 3-4 shift plate 92 and having a notch 108, similar to the notch in either shift plate 91 or 92, to receive either the selector finger 89 or the interlock plate 94. The tube 105 extends into the extension housing 16, and the 5-6 shift fork 69 is retained on this tube to move axially therewith, but is free to rotate relative to the tube. The reverse shift arm 99 is prevented from rotating via a pin 109 which passes through the 5-6 shift arm 104 and slides in a slot 111 in the shift arm to allow axial movement thereof.

The notched ends 107 and 102 of the 5-6 shift arm 104 and reverse shift arm 99, respectively, function just like the 1-2 and 3-4 shift plates 91 and 92. By using the tube 105 on the 5-6 shift arm, which tube is concentric with the lower shift rail 98, space is saved. Since the reverse and 5-6 shift forks are free to rotate about the lower shift rail, these forks are prevented from rotating by the fit at the fork with the synchronizer clutch sleeve. This allows a close fit of the fork to the sleeve without causing a bind.

Figure 4:
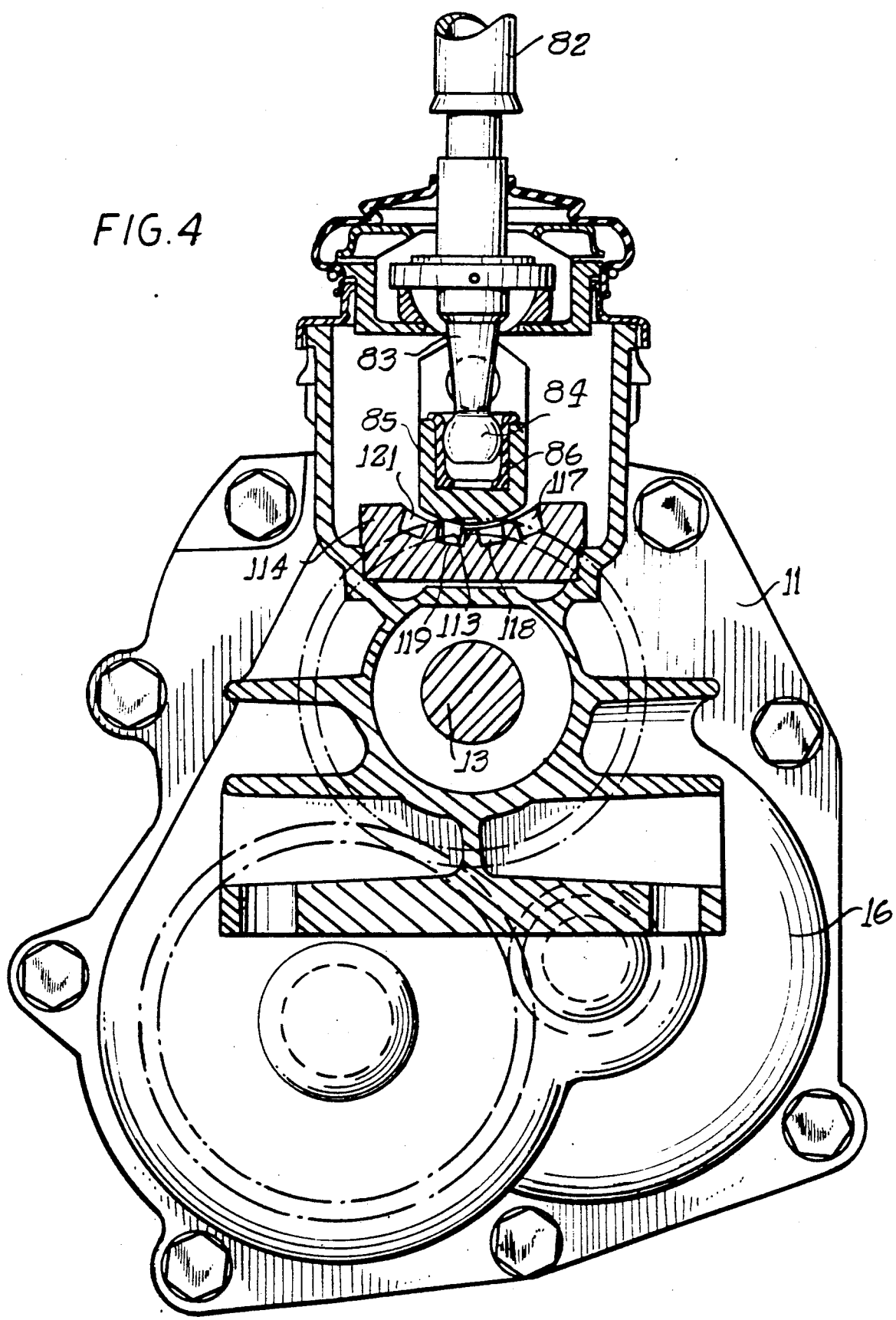
FIG. 4 is a cross sectional view taken on the irregular line 4—4 of FIG. 1 showing details of the shift lever.
Figure 5:
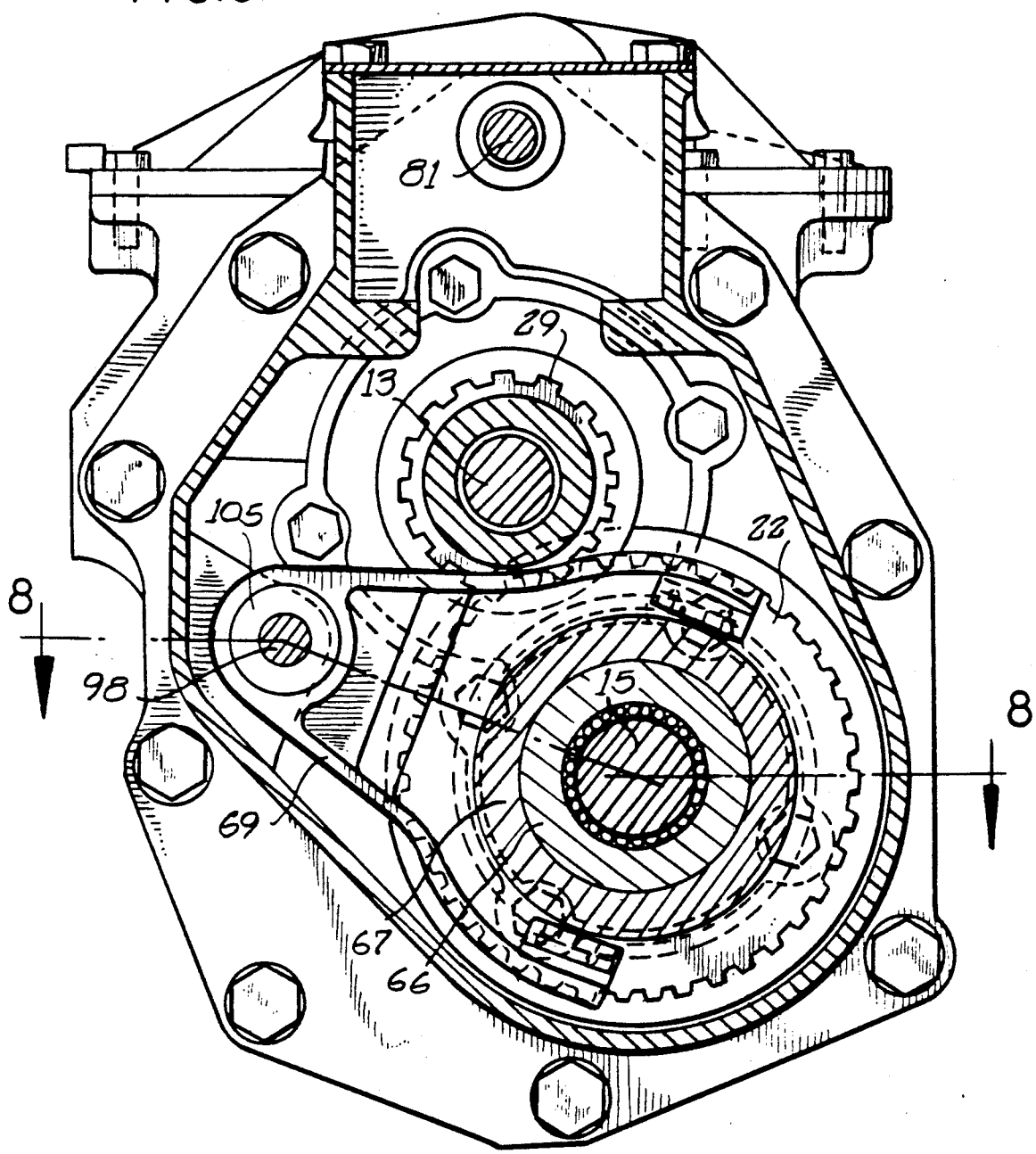
FIG. 5 is a cross sectional view taken on the line 5—5 of FIG. 1 showing the 5—6 shift fork.
Figure 6:
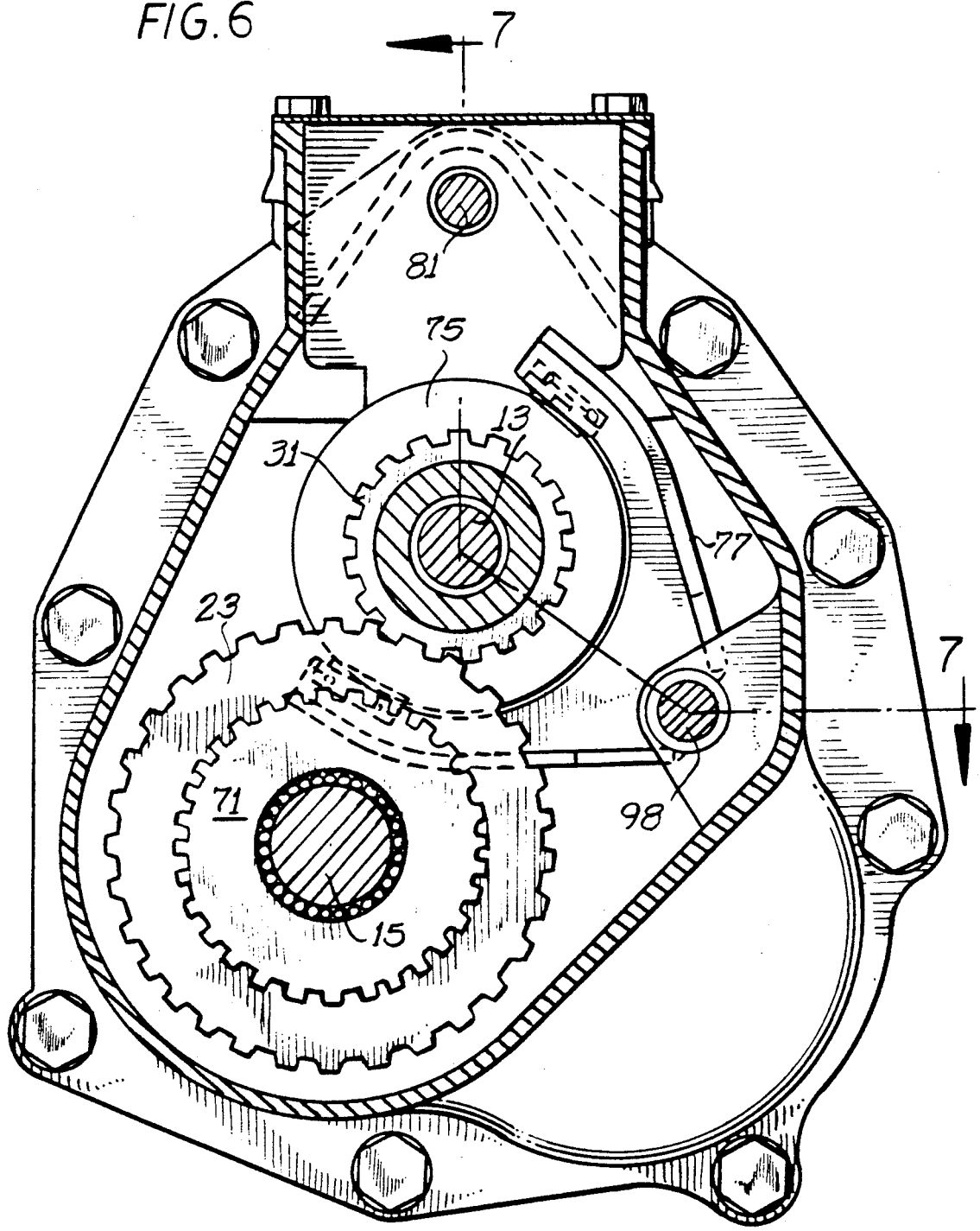
FIG. 6 is a cross sectional view taken on the line 6—6 of FIG. 1 showing the reverse shift fork.
Figure 7:
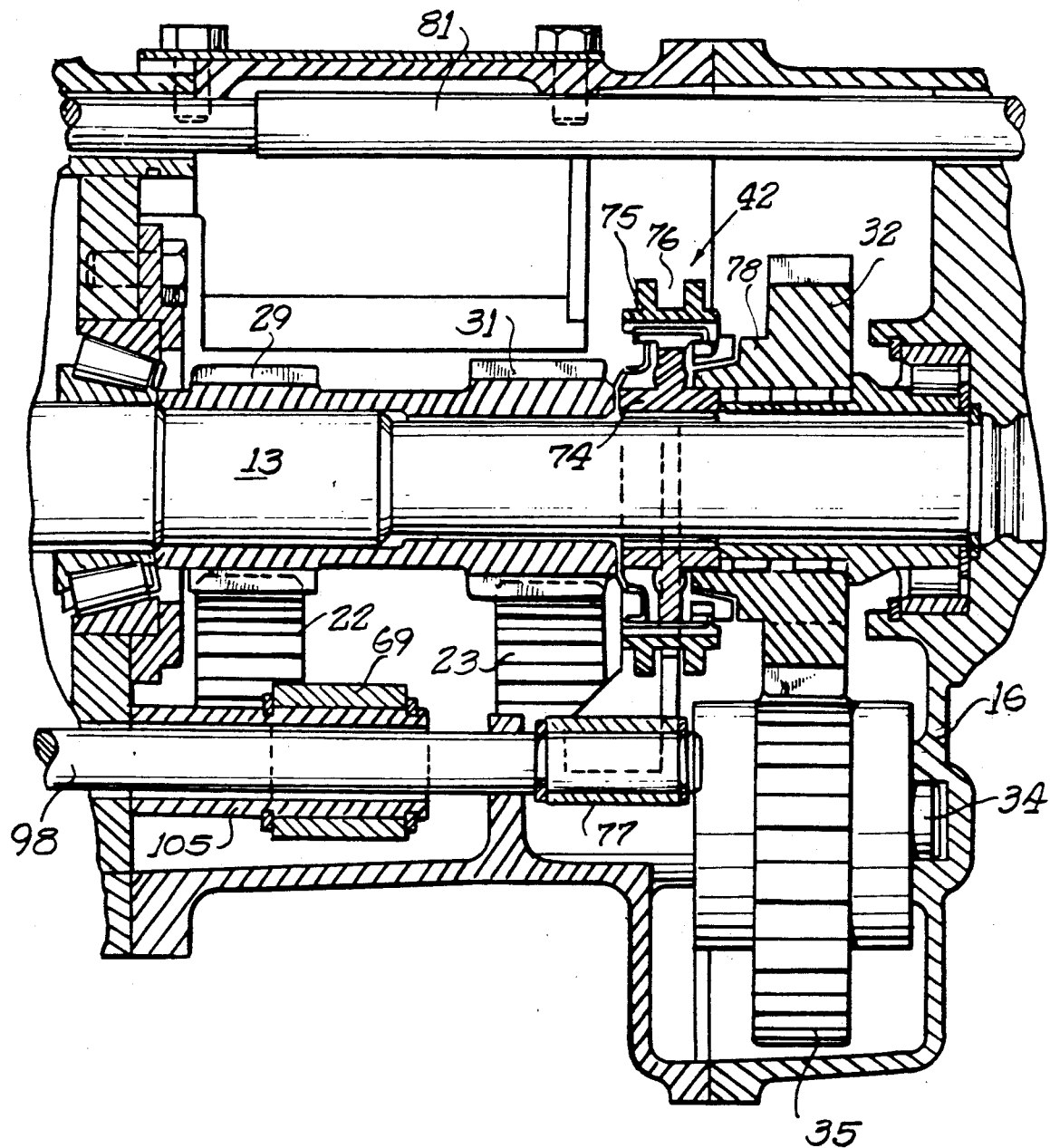
FIG. 7 is a cross sectional view taken on the irregular line 7—7 of FIG. 6 showing the rear portion of the auxiliary shift rail in relation to the reverse gears.
Figure 8:
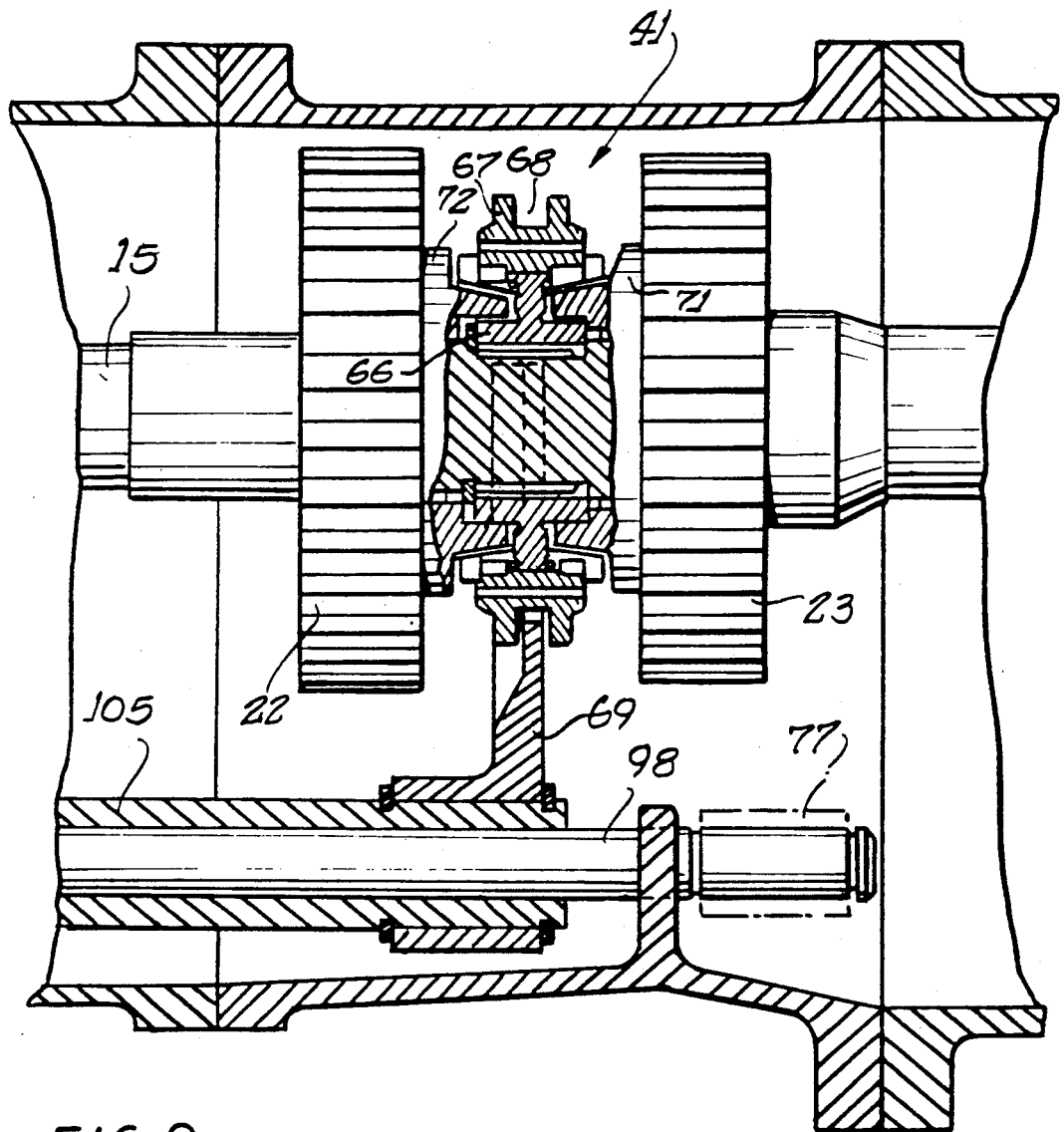
FIG. 8 is a cross sectional view taken on the irregular line 8—8 of FIG. 5 showing the auxiliary shift rail in relation to the fifth and sixth gears.

Now considering operation of the transmission 10, the shift lever 82 is manipulated by the vehicle operator to smoothly move the vehicle from a stationary position through the gear ratios as the vehicle accelerates until it reaches highway operating speed. The offset lever 85 includes a depending finger 113 centrally located on the underside thereof to be received in a detent guide plate 114. Also, a springbiased detent ball 115 located in the lever is received in one of several depressions 116 in the guide plate. The finger engages in one of four tracks 117, 118, 119 or 121 (FIG. 4) formed in the guide plate to function as a cam follower and cam defining the permissible axial translation and rotation of the shift rail 81. These tracks provide the shift pattern seen in FIG. 9.

Rotating the shift lever so that the finger 113 moves through a lateral neutral track 122 (FIG. 1) to the 1-2 track 118, the selector finger 89 is received in the notch in the shift plate 91 and the shift lever then is moved longitudinally to move the shift rail 81 so that the shift plate 91 actuates the 1-2 shift fork 54 to slide the sleeve 52 to engage the teeth on gear 28 through the selector body 88 and finger 89. Simultaneously with engagement of the shift plate 91 by finger 89, the interlock plate 94 is received in the notches of the plate 92, the 5-6 shift arm 104 and the reverse shift arm 99. Likewise, the shift lever may shift from first gear to the second gear by moving the shift rail longitudinally in the opposite direction, the finger 113 remaining in track 118.

To shift to third gear, the lever 82 is rotated to move the finger 113 in the neutral track 122 to the 3-4 track 119 for the 3-4 shift with the selector finger 89 received in the notch of plate 92. The lever then shifts the rail longitudinally to the third gear position by shifting the 3-4 shift fork 62 and clutch sleeve 59 to engage the teeth 63 on the third gear 26. Moving the shift lever in the opposite longitudinal direction moves the shift fork to engage the teeth 64 on the gear 14 for fourth gear. As seen in FIG. 1, the gear 14 is on the end of the input shaft 12 so that the transmission is now in direct drive.

To shift into fifth or sixth gear, the finger 113 is again moved through the neutral track 122 and shifted by rotation of the lever 82 to rotate the shift rail and locate the finger in the 5-6 track 121 with the selector finger 89 received in notch 108. Shifting the rail longitudinally will move the 5-6 shift fork 69 and clutch sleeve 67 to engage the teeth 71 on fifth gear 23 through the 5-6 shift arm 104 on the lower shift rail 98 and notch 108 in the branch 107 of the arm. During the engagement of the 5-6 synchronizer, the interlock plate 94 engages the notches in the shift plates 91 and 92 and the notch 103 in the reverse shift arm 99 to prevent axial movement of the corresponding shift forks. Longitudinal movement of the shift rail in the opposite direction will engage the synchronizer clutch with the sixth gear.

To shift into reverse, the shift lever is rotated counterclockwise beyond the track 118 to where the finger 113 is aligned with a reverse track 117 wherein the selector body 88 engages the notch 103 in the end 102 of the reverse shift arm 99, which is pivoted on the lower shift rail 81. Simultaneously, the interlock plate 94 engages the notches in the plates 91 and 92 and the notch 108 in the 5-6 shift arm 104 to prevent axial shifting of the shift plates 91 and 92 or the 5-6 shift arm 104.

INDUSTRIAL APPLICABILITY

The invention described herein is readily applicable for the transmission of torque from the engine to the driving wheels of an automotive vehicle, such as an automobile, truck or bus.

I claim:

1. In a sliding gear manual transmission (10) for an automotive vehicle including a transmission housing (11), an input shaft (12) journalled in the housing, an output shaft (13) axially aligned with the input shaft and journalled in said housing, a countershaft (15) journalled in said housing and carrying a cluster gear (17) thereon, said input shaft (12) terminating in an input gear (14), a plurality of gears (26, 27, 28, 29, 31, 31) on said output shaft (13) in meshing engagement with said cluster gear (17), and a plurality of synchronizing clutches (36, 38, 41, 42) on said output shaft and countershaft for engagement of gear ratios of said meshing gears, and an axially movable and rotatable shift rail (81) located in said housing and operatively connected to a shift lever (82) actuated by the vehicle operator, the improvement comprising an auxiliary shift rail (98) located in said housing (11) generally paralleling said first mentioned shift rail (81) to provide for actuation of fifth, sixth and reverse gears, said auxiliary shift rail (98) having a 5-6 shift arm (104) journalled thereon for axial movement relative thereto, and a reverse shift arm (99) rotatably mounted thereon for axial movement therewith.

2. A transmission for an automotive vehicle as set forth in claim 1, in which said transmission (10) is provided with six forward gear ratios and a reverse gear ratio, and said synchronizer clutches include a 1-2 synchronizer (36), a 3-4 synchronizer (38) and a reverse synchronizer (42) mounted on said output shaft (13), and a 5-6 synchronizer (41) mounted on said countershaft (15).

3. A transmission for an automotive vehicle as set forth in claim 2, in which said 5-6 synchronizer (41) is actuated by a 5-6 shift arm (104) including a tube (105) mounted for axial movement on said auxiliary shift rail (98) and having a branch (107) extending up to said primary shift rail (81) and terminating in a notched end (108) to be actuated by an selector plate (88) on said primary shift rail (81), said 5-6 shift arm (104) actuating the 5-6 shift fork (69) for the 5-6 synchronizer.

4. A transmission for an automotive vehicle as set forth in claim 3, in which said 5-6 shift arm (104) and tube (105) are mounted on said auxiliary shift rail (98) for both axial and rotary movement thereon.

5. A transmission for an automotive vehicle as set forth in claim 2, wherein said reverse synchronizer (42) encompasses said output shaft (13) and is positioned adjacent a reverse gear (32) journalled on said output shaft, a reverse shift fork (77) operates said reverse synchronizer and is operatively connected to the auxiliary shift rail (98) for axial movement therewith, and a reverse shift arm (99) secured onto said auxiliary shift rail and extending upward from said auxiliary shift rail to terminate in a notched end (102) adjacent said primary shift rail (81).

6. A transmission for an automotive vehicle as set forth in claim 5, wherein said reverse gear (32) on said output shaft (13) meshes with a reverse gear (24) in said gear cluster (17) on said countershaft (15), and an idler shaft (34) journalled in said housing carries an idler gear (35) in meshing engagement with said reverse gears (24, 32) on said output shaft and countershaft.

* * * * *